Sept. 4, 1956 S. C. SMITH 2,761,549
CABLE TYPE TROLLEY CONVEYOR
Filed Jan. 3, 1952 3 Sheets-Sheet 2
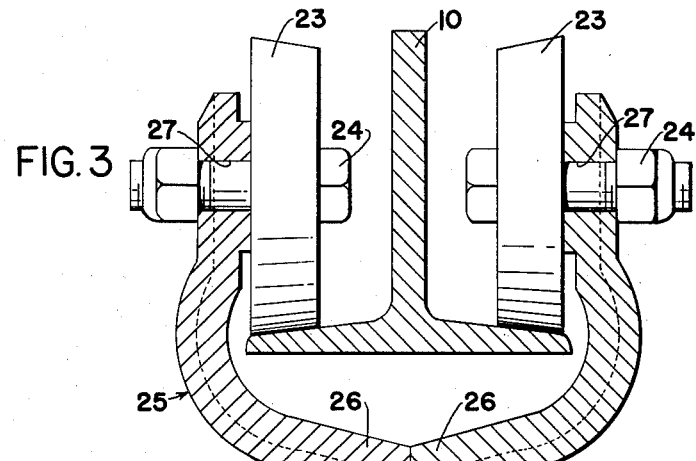
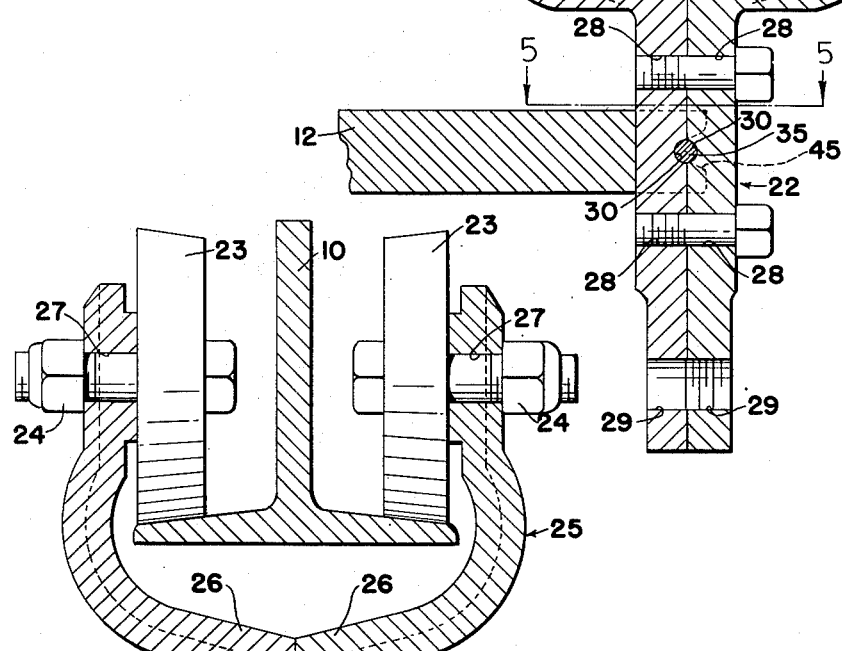
INVENTOR.
STILES C. SMITH
BY Ely & Frye
ATTORNEYS Sept. 4, 1956 S. C. SMITH 2,761,549
CABLE TYPE TROLLEY CONVEYOR
Filed Jan. 3, 1952 3 Sheets-Sheet 3

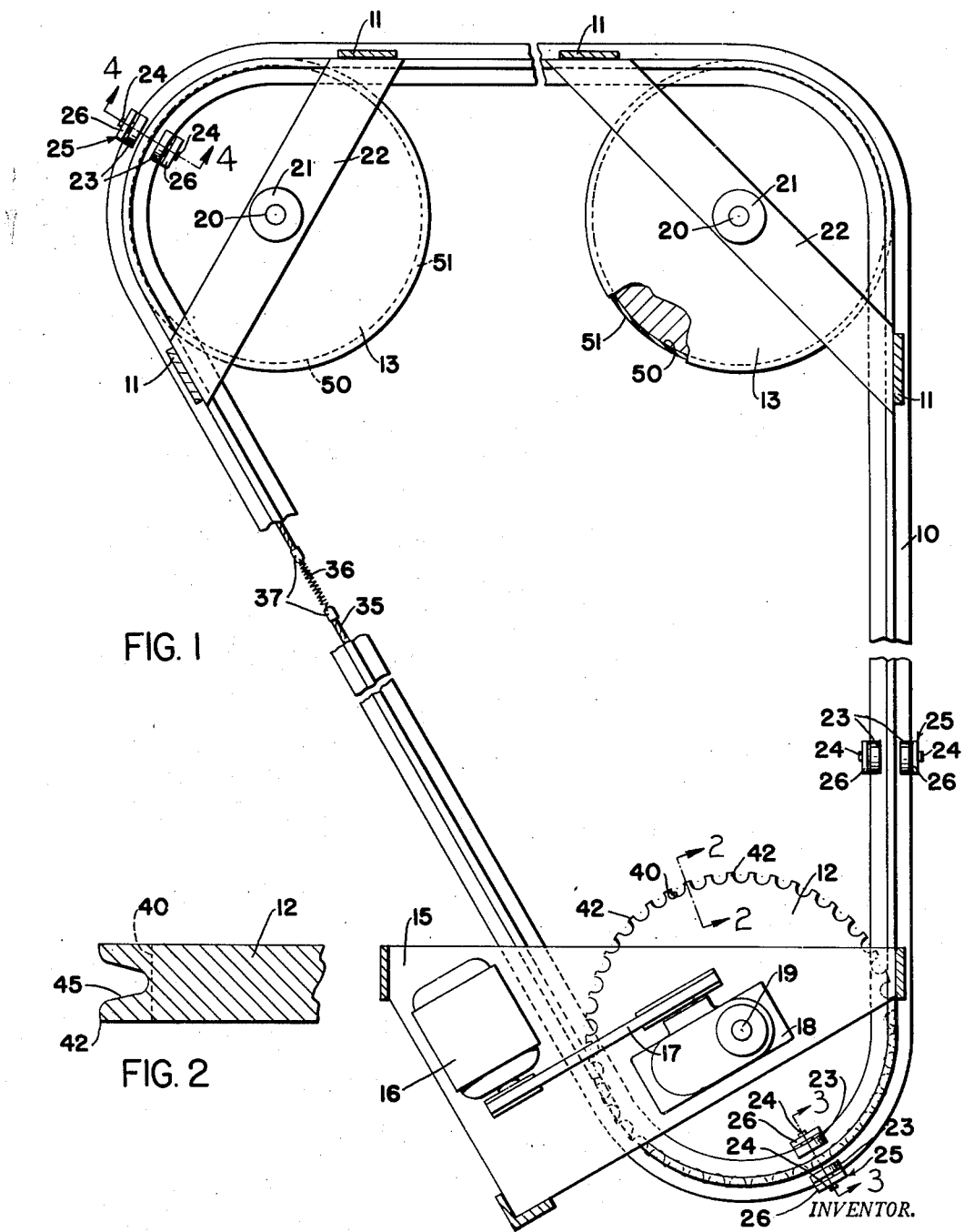

INVENTOR.
STILES C. SMITH
BY Ely & Frye
ATTORNEYS

United States Patent Office 2,761,549
Patented Sept. 4, 1956

2,761,549
CABLE TYPE TROLLEY CONVEYOR

Stiles C. Smith, Mentor-on-the-Lake, Ohio, assignor, by mesne assignments, to John Kimmel, Cleveland, Ohio Application January 3, 1952, Serial No. 264,759

3 Claims. (Cl. 198—177)

The present invention relates to conveyors and particularly to overhead cable conveyors wherein a series of trolleys supported on and depending from an inverted T-beam are spaced and driven by a flexible cable or chain extending from trolley to trolley.

Heretofore the most satisfactory drive means for cable or chain type trolley conveyors has comprised a notched drive wheel or pulley designed to mesh in driving engagement with the successive blocks or sleeves by means of which each trolley is connected to the chain or cable. In conveyors employing such a drive means, the trolleys and their driving blocks or sleeves must be spaced apart a standard length or a multiple thereof to provide for proper meshing with the drive wheel.

The necessity in prior conveyors for equal spacing of the trolleys has several disadvantages. In the first place, it is desirable that a conveyor installation be adaptable to quick changeover from one loading requirement to another. Also, it is occasionally necessary to replace outworn trolleys. The necessity for careful spacing of the trolleys requires that the line be shut down while the changeover or replacement is effected so that the requisite spacing of newly installed trolleys may be carefully measured off. However, shutdown of a complete line will involve complications if the speed of the line is critical to operations performed on the load. For instance, coated objects carried through baking ovens over which a line runs may have to be rejected in case of shutdown because of overheating and resulting damage to the coating. Secondly, flexible cables or chains will become stretched in use and will also change in length as temperatures and loading conditions vary. When the variation becomes too great there is no longer proper meshing with the drive pulley and the conveyor line stalls or breaks down.

I have provided a cable or chain type trolley conveyor which overcomes the above disadvantages by embodying a conveyor drive which will function regardless of the spacing between successive trolleys. Trolleys may be added to or replaced in my system while it is operating and without close regard for trolley spacing. Variations in cable or chain length will not interfere with the continuous operation of the system. Furthermore, my conveyor employs trolleys which are of very simple and inexpensive construction. My trolleys may be assembled from a supply of one simple standard casting by using one standard type of bearing wheel together with standard bolts. This very economical trolley performs multiple functions. In engagement with the drive sprocket, it serves as an element of the drive linkage in functioning as a positively driven cog or link and as a cable gripping or driving element. In all positions, it functions as the load supporting element.

My conveyor embodies the idea of providing a series of driven surfaces (formed by the shanks of my trolleys) mechanically analogous to the driven surfaces on the links of a sprocket driven chain, but with the driven surfaces joined by resiliently elongatable member rather than a series of links of fixed dimensions. The novel self-compensating operation of this resilient linkage is fully set forth below.

Other objects and advantages of my invention will become apparent from examination of the following specification and the accompanying drawings in which:

Figure 1 is a plan view, partially broken away, of a conveyor embodying my invention.

Figure 2 is an elevational view in cross section taken on line 2—2 in Figure 1.

Figure 3 is an elevational view in cross section taken on line 3—3 in Figure 1 and showing a trolley in association with the drive sprocket.

Figure 4 is an elevational view in cross section taken on line 4—4 in Figure 1 and showing another trolley in association with one of the idler pulleys.

Figures 5, 6:
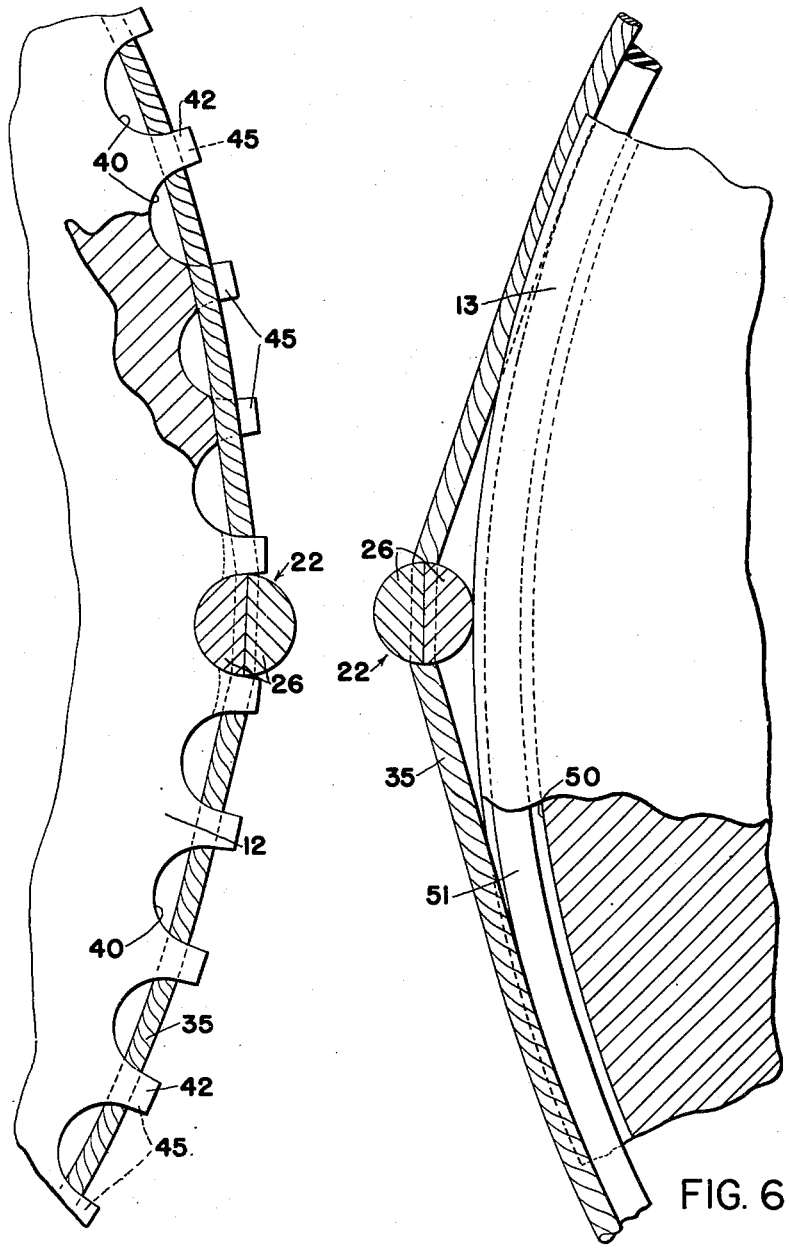
Figure 5 is a plan view, partially broken away, taken along line 5—5 in Figure 3.
Figure 6 is a plan view, partially broken away, taken along line 6—6 in Figure 4.

The general organization of a conveyor embodying my invention is best illustrated in Figure 1. An inverted T-beam 10 is suitably supported as by straps 11 from overhead structural members. The T-beam 10 extends along the path of the articles to be conveyed and lies above the periphery of the drive sprocket 12 and the idler pulleys 13. A power drive is suitably supported on a platform 15 above the drive sprocket 12. The power drive may comprise a motor 16, a belt 17, and a variable ratio speed reducer 18 designed to rotate the drive sprocket shaft 19 at any chosen speed. The idler sprocket shafts 20 are received in suitable bearings 21 mounted on horizontal beams 22.

Depending from the T-beam 10 are a plurality of spaced split shank trolleys 25, best illustrated in Figures 3 and 4. Each trolley 25 comprises a pair of forged cast or stamped halves 26. Each half 26 has formed therein a trolley wheel bolt hole 27 and a pair of clamping bolt holes 28 together with a load bolt receiving hole 29. A trolley wheel bolt 24 passes through each of the holes 27 to mount a standard roller bearing or ball bearing trolley wheel 23. The shank portion of each half 26 is semi-circular in cross-section so as to form a circular trolley shank portion 22 when the halves are fastened together as may be seen most clearly in Figures 5 and 6. Formed in each half 26 is a slot 30 engaging a cable 35 in clamping relationship. The slot 30 preferably has an outside diameter about 1/64 inch smaller than the outside diameter of the cable 35. The cable 35 extends from trolley to trolley throughout the conveyor circuit maintaining each trolley in spaced relationship from its neighbor. At at least one location, the cable 35 is severed, the severed ends being joined by a resilient spring 36 suitably fastened to the cable ends as by pinch-on caps 37.

It will be noted that the pairs of trolley halves 26 forming each trolley shank are identical in all respects except that one of each pair of matching holes 28 and 29 is tapped while its corresponding opposite has a smooth bore equal in diameter to the outside thread diameter of bolts to be received.

The drive sprocket 12 comprises a disc whose periphery is notched with notches 40 of circular cross-section. The centers of radius of the notches 40 preferably lie slightly inside of the greatest peripheral radius of the drive sprocket so that the radially outwardmost portion of each tooth 42, formed by adjacent notches 40, has flat radially extending sides. A slot 45 (see Figures 3 and 5) is cut in each tooth 42, the series of slots 45 comprising an annular cable receiving groove around the periphery of the drive sprocket 12.

Each of the idler pulleys 13 comprises a disc having an annular groove 50 formed around its outside periphery.

Idler wheels 13 may be conveniently manufactured from standard pulley wheels by cementing a section of pulley belt 51 permanently in the pulley groove so that the pulley together with the outside of the pulley belt will present a shallow non-slip cable receiving groove which will give quiet operation.

The radius of the circular portions of the notches 40 on the drive sprocket are substantially equal to the radius of the cylindrical portion 22 of the shank of each trolley 25. The drive sprocket and the idler pulleys are mounted below the T-beam 10 such a distance that the cylindrical portion of each trolley shank will bear on their rims as the trolley passes. As any given trolley approaches the drive sprocket 12, its round shank will tend to come into meshing engagement with the notches 40. If the round shank is initially out of mesh with the notches 40 and rides up on one of the teeth 42, a slight succeeding advance of the sprocket wheel 12 will cause the trolley shank to either fall ahead into the next preceding notch 40, or to fall back into the next succeeding notch 40, resulting elongation or contraction of the cable 35 being compensated for by the spring 36.

Even when closely spaced trolleys are simultaneously engaged with the sprocket 12, the rear sprocket will be free to drop into meshing engagement even though the spacing between the two shanks is such as to prevent the second shank from dropping backwardly into a notch 40. Under these circumstances, the resilient coupling in the cable will still make it possible for the shank to ride over a tooth 42 and forwardly into a notch 40. In the rare event that a trolley shank under such circumstances "hangs up" on the rearmost shoulder of a tooth 42, nevertheless that trolley shank will be free to fall into meshing engagement immediately upon disengagement of the leading trolley shank from the drive sprocket 12. Thus, under all circumstances at least one trolley shank will remain in driving engagement with the sprocket 12.

The cable 25 rides in the peripheral groove formed by the slots 45 as illustrated in Figure 2. The cable and its associated trolley shank portions 22 are thus smoothly guided into firm engagement with the drive sprocket rim. Any tendency of a trolley shank to ride up on the sprocket rim is overcome by engagement of the sides of the slots 45 with the cable 35, the trolley shank being free only to move backward or forward until it is firmly seated in one of the notches 40. The spring 36 is of substantially the same outside diameter as the cable 35 and is therefore also adapted to ride in the peripheral groove formed by the slots 45.

Engagement of the cable and trolley shanks with the idler pulleys is illustrated in Figure 6. The trolley shanks ride up on the rim of the idler pulley while the portions of the cable 35 intermediate successive pairs of trolleys ride in the shallow peripheral groove in frictional engagement with the outside of the pulley belt 51.

It will be apparent from the above description that many modifications in my invention will occur to those familiar with trolley conveyors. Accordingly, my invention is not to be limited to the specific embodiment disclosed above, but its scope is to be defined solely by the following claims.

What is claimed is:

1. A trolley conveyor comprising an endless conveyor track, a plurality of trolleys rollably bearing on upper surfaces of said track and depending therefrom, each of said trolleys comprising a cylindrical shank portion, a cable passing through and clamped in non-slipping engagement with each of said cylindrical shank portions whereby said cable extends underneath said conveyor track throughout its circuit, at least one resilient spring section in said cable, at least one horizontal guide pulley and one horizontal drive sprocket each being rotatably mounted under a corresponding horizontal circular bend in said conveyor track, each of said pulleys and sprockets having an axis of rotation passing through the center of bend of its corresponding circular bend, said drive sprocket having closely spaced vertical notches formed around its rim, the roots of said notches having a semi-circular cross-section substantially equal in diameter to said cylindrical shank portions of said trolleys, successive pairs of said notches defining intervening teeth, each of said teeth having a mediate slot communicating between adjacent notches, said mediate slots forming a discontinuous groove around the periphery of said drive sprocket for reception of said cable, and power means to rotate said drive sprocket.

2. In a cable type trolley conveyor, a driving sprocket a portion of the periphery of which underlies a conveyor track, said track supporting depending trolleys each having a shank portion of rounded cross-section, a cable passing through said rounded shank portions and clamped in non-slipping engagement therewith, said drive sprocket having closely spaced vertical notches formed around its rim, the roots of said notches having a rounded cross-section whereby said notches are adapted to receive said rounded shank portions, successive pairs of said notches defining intervening teeth, each of said teeth having a mediate slot communicating between adjacent notches, said mediate slots forming a discontinuous groove around the periphery of said drive sprocket for reception of said cable, said track forming a closed loop, said cable forming a closed loop under said track, said cable being longitudinally stretchable to accommodate reception of said shanks in said notches regardless of the arbitrary spacing of said trolleys along said cable.

3. In a cable type trolley conveyor, a driving sprocket, a conveyor track overlying a portion of the periphery of said driving sprocket and supporting depending trolleys each having a shank portion of rounded cross-section, a cable passing through said rounded shank portions and clamped in non-slipping engagement therewith, said drive sprocket having closely spaced axially extending notches formed around its rim, said notches being slightly wider than said rounded shank portions whereby said notches are adapted to receive said rounded shank portions, successive pairs of said notches defining intervening teeth, each of said teeth having a mediate slot communicating between adjacent notches, said mediate slots forming a discontinuous groove around the periphery of said drive sprocket for reception of said cable, said track forming a closed loop, said cable forming a closed loop under said track, said cable being longitudinally stretchable to accommodate reception of said shanks in said notches regardless of the arbitrary spacing of said trolleys along said cable.

References Cited in the file of this patent

UNITED STATES PATENTS

| Number | Name | Date |
|---|---|---|
| 810,149 | Horst | Jan. 16, 1906 |
| 2,349,578 | Ellen | May 23, 1944 |
| 2,425,141 | Bernau | Aug. 5, 1947 |
| 2,471,042 | Ramsay | May 24, 1949 |
| 2,556,487 | Vogt | June 12, 1951 |

FOREIGN PATENTS

| Number | Country | Date |
|---|---|---|
| 422,498 | Great Britain | Jan. 14, 1935 |
| 622,808 | Great Britain | May 6, 1949 |